(12) United States Patent
Yong (10) Patent No.: US 11,541,934 B2
(45) Date of Patent: Jan. 3, 2023

(54) FENDER APRON, VEHICLE BODY PROVIDED WITH THE SAME, AND MANUFACTURING METHOD FOR THE SAME

(71) Applicants: HYUNDAI MOTOR COMPANY, Seoul (KR); KIA MOTORS CORPORATION, Seoul (KR)

(72) Inventor: Jiae Yong, Gangneung-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 115 days.

(21) Appl. No.: 17/215,653

(22) Filed: Mar. 29, 2021

(65) Prior Publication Data

US 2022/0126921 A1    Apr. 28, 2022

(30) Foreign Application Priority Data

Oct. 27, 2020   (KR) ........................ 10-2020-0140203

(51) Int. Cl.
| | |
|---|---|
| *B60J 7/00* | (2006.01) |
| *B62D 21/15* | (2006.01) |
| *B62D 25/16* | (2006.01) |
| *B62D 25/08* | (2006.01) |
| *B60Q 1/26* | (2006.01) |

(52) U.S. Cl.
CPC ......... *B62D 21/152* (2013.01); *B60Q 1/2619* (2013.01); *B62D 25/082* (2013.01); *B62D 25/16* (2013.01); *B60Y 2304/05* (2013.01)

(58) Field of Classification Search
CPC ....... B60K 11/04; F01P 11/0238; F01P 7/042; H01Q 1/1285; Y02E 60/50; Y02T 10/12; F16D 35/023; F01M 5/002; F02B 3/06
See application file for complete search history.

(56) References Cited

U.S. PATENT DOCUMENTS

| | | | | |
|---|---|---|---|---|
| 2,004,258 | A * | 6/1935 | Waterbury | B62D 27/04 180/54.1 |
| 3,188,132 | A * | 6/1965 | Schwiering | B62D 25/082 296/203.02 |
| 4,742,881 | A * | 5/1988 | Kawaguchi | B60K 11/04 248/634 |
| 8,596,713 | B1 * | 12/2013 | Lee | B62D 25/163 296/203.02 |
| 2018/0362091 | A1 * | 12/2018 | Cha | B62D 21/17 |
| 2022/0048570 | A1 * | 2/2022 | Kim | B62D 21/155 |
| 2022/0126678 | A1 * | 4/2022 | Gim | B60R 19/023 |
| 2022/0153126 | A1 * | 5/2022 | Yong | B60H 1/00521 |

* cited by examiner

*Primary Examiner* — Kiran B Patel
(74) *Attorney, Agent, or Firm* — Lempia Summerfield Katz LLC (57) ABSTRACT

A fender apron includes: a front member; an upper member provided on the front member; a radiator side member connected to the front member; an upper lamp support member connecting the radiator side member and the upper member; and a side upper reinforce member connecting a first connection portion disposed between the front member and the radiator side member and a second connection portion disposed between the upper member and the upper lamp support member.

18 Claims, 15 Drawing Sheets

FENDER APRON, VEHICLE BODY PROVIDED WITH THE SAME, AND MANUFACTURING METHOD FOR THE SAME

CROSS-REFERENCE TO RELATED APPLICATION

This application claims priority to and the benefit of Korean Patent Application No. 10-2020-0140203, filed on Oct. 27, 2020, the entire contents of which are incorporated herein by reference.

FIELD

The present disclosure relates to a fender apron, a vehicle body provided with the same, and a manufacturing method for the same.

BACKGROUND

The statements in this section merely provide background information related to the present disclosure and may not constitute prior art.

A typical fender apron applies a single impact load path using a back beam and a side member to respond to crash safety regulations.

In the case of a separate lamp where the general head lamp and the turn signal lamp are separated, a separate bracket is desired for applying the mounting structure. However, in the radiator support type (non-module structure), a separate structure for mounting a detachable lamp is not applied, and an appropriate response to the collision safety regulation cannot be performed.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a fender apron capable of providing lamp mounting and front collision safety, a vehicle body including the same, and a manufacturing method for the same.

A fender apron according to one form of the present disclosure may include a front member, an upper member provided on the front member, a radiator side member connected to the front member, an upper lamp support member connecting the radiator side member and the upper member, and a side upper reinforce member connecting a first connection portion disposed between the front member and the radiator side member and a second connection portion disposed between the upper member and the upper lamp support member.

The fender apron may further include a head lamp mounting section configured to mount a head lamp, and formed between the radiator side member, the upper lamp support member and the side upper reinforce member.

The fender apron may further include a turn signal lamp mounted on the upper lamp support member.

The radiator side member may include a lower body coupled to the front member, and an upper body that is connected to the upper lamp support member and has a narrower width than a width of the lower body.

The radiator side member may include a radiator front panel portion disposed in a front direction of the vehicle, and a radiator side panel portion bent at the radiator front panel portion and forming a side surface.

The radiator side member may further include a radiator upper panel portion bent at the radiator front panel portion forming an upper surface.

The fender apron according to one form of the present disclosure may further include a lamp support bracket formed in a "U" shape and connecting the radiator side panel portion and the radiator upper panel portion.

The upper lamp support member may include a support main body connecting the radiator side member and the upper member, a support inner surface bent inward of the vehicle width at the support main body, and a support outer surface bent outward of the vehicle width from the support main body and formed to be longer than the support inner surface.

The side upper reinforce member may include a longitudinal section connected to the radiator side member, and an inclined section connected to the upper member.

The side upper reinforce member may include a reinforce main portion, and a reinforce side portion bent from the reinforce main portion.

A vehicle body according to one form of the present disclosure may include a radiator support upper member connecting the upper parts of the fender apron provided on both sides of the vehicle front side, and a radiator support lower member connecting the lower parts of the both fender apron.

The radiator side member, the upper lamp support member and the side upper reinforce member may form an inverted triangle shape.

The vehicle body may further include a head lamp mounting section configured to mount a head lamp, and formed between the radiator side member, the upper lamp support member and the side upper reinforce member.

The vehicle body may further include a turn signal lamp mounted on the upper lamp support member.

The radiator side member and the front member may form a first impact load path, the radiator side member, the upper lamp support member and the upper member may form a second impact load path, and the radiator side member, the side upper reinforce member and the upper member may form a third impact load path.

The vehicle body according to one form of the present disclosure may further include a lamp support bracket formed in a "U" shape, connecting the radiator side panel portion and the radiator upper panel portion, and provided between the radiator side member and the upper lamp support member.

A manufacturing method of the fender apron according to one form of the present disclosure may include connecting the side upper reinforce member and the upper member to the front member, connecting the radiator side member to the front member and the side upper reinforce member, and connecting the upper member of the radiator side member and the upper member through the upper lamp support member.

The manufacturing method according to one form of the present disclosure may further include connecting the upper part of the fender apron to the radiator support upper member.

According to one form of the present disclosure, it is possible to respond to the collision safety regulation by distributing the collision load.

According to one form of the present disclosure, lamp mounting is possible without a separate bracket.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the drawings, the thickness of layers, films, panels, regions, etc., are exaggerated for clarity.

When a part such as a layer, film, region, or plate is said to be "on" another part, this includes not only the case directly above the other part, but also the case where there is another part in between.

In contrast, when an element is referred to as being "directly on" another element, there are no intervening elements present.

Throughout the specification, when a part "includes" a certain component, it means that other components may be further included rather than excluding other components unless specifically stated to the contrary.

Figure 1:
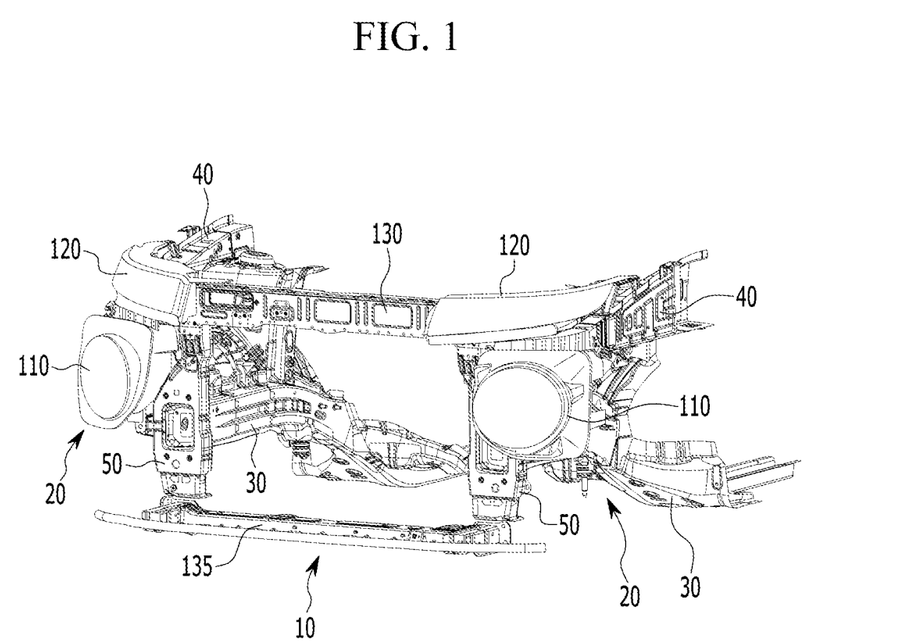
FIG. 1 is a perspective view of a vehicle body including a fender apron according to one form of the present disclosure.
Figure 2:
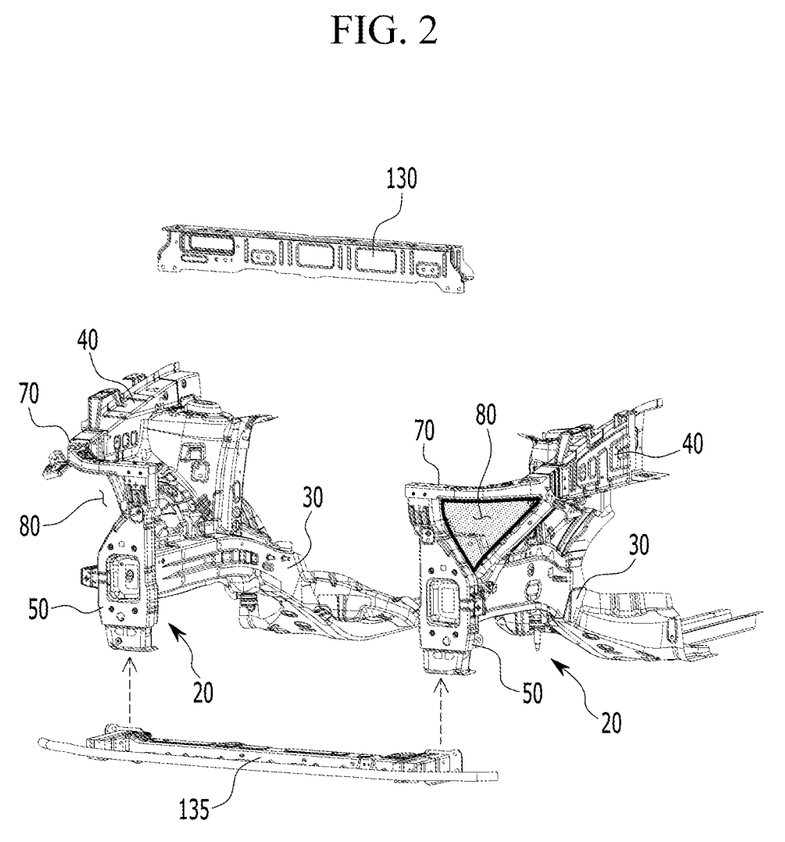
FIG. 2 is a partial exploded perspective view of a vehicle body including a fender apron according to one form of the present disclosure.

FIG. 1 is a perspective view of a vehicle body including a fender apron according to one form of the present disclosure, and FIG. 2 is a partial exploded perspective view of a vehicle body including a fender apron according to one form of the present disclosure.

Referring to FIG. 1 and FIG. 2, a vehicle body 10 according to one form of the present disclosure may include a fender apron 20 provided on both front sides of the vehicle, a radiator support upper member 130 connecting the upper parts of the both fender apron 20, and a radiator support lower member 135 connecting the lower portion of the both sides of the fender apron 20.

The vehicle body 10 according to one form of the present disclosure can be particularly applied to a light small vehicle of a non-module (radiator support) type requiring cost competitiveness.

Figure 3:
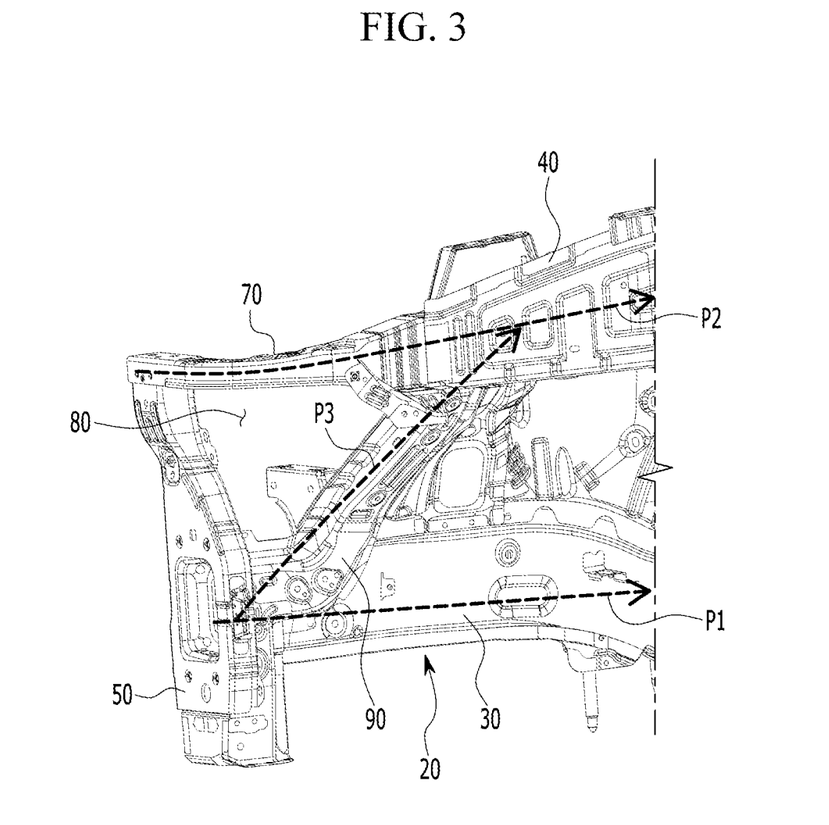
FIG. 3 is a perspective view of a fender apron according to one form of the present disclosure.

FIG. 3 is a perspective view of a fender apron according to one form of the present disclosure.

Referring to FIG. 1 to FIG. 3, The fender apron 20 according to one form of the present disclosure may include a front member 30, an upper member 40 provided on the front member 30, a radiator side member 50 connected to the front member 30, an upper lamp support member 70 connecting the radiator side member 50 and the upper member 40, and a side upper reinforce member 90 connecting a connection portion between the front member 30 and the radiator side member 50 and a connection portion between the upper member 40 and the upper lamp support member 70.

A head lamp mounting section 80 for mounting a head lamp 110 may be formed between the radiator side member 50, the upper lamp support member 70 and the side upper reinforce member 90.

The radiator side member 50, the upper lamp support member 70 and the side upper reinforce member 90 may form an inverted triangle shape.

That is, the radiator side member 50, the upper lamp support member 70 and the side upper reinforce member 90 can be combined into a stable triangle shape, and the head lamp 110 can be mounted on the head lamp mounting section 80.

The radiator side member 50 and the front member 30 may form a first impact load path P1, and the radiator side member 50, the upper lamp support member 70 and the upper member 40 may form a second impact load path P2. The radiator side member 50, the side upper reinforce member 90 and the upper member 40 may form a third impact load path P3.

The fender apron 20 according to one form of the present disclosure has a three impact load path to distribute the impact load, and the head lamp mounting section 80 buffer impact in the event of a vehicle collision, and can also be used as a space to mount the head lamp 110.

A turn signal lamp 120 may be mounted on the upper lamp support member 70.

The fender apron 20 according to one form of the present disclosure may cope with the reinforced collision load regulation, and it is possible to mount a separate detachable lamp including the head lamp 110 and the turn signal lamp 120 without a separate bracket.

Figure 4:
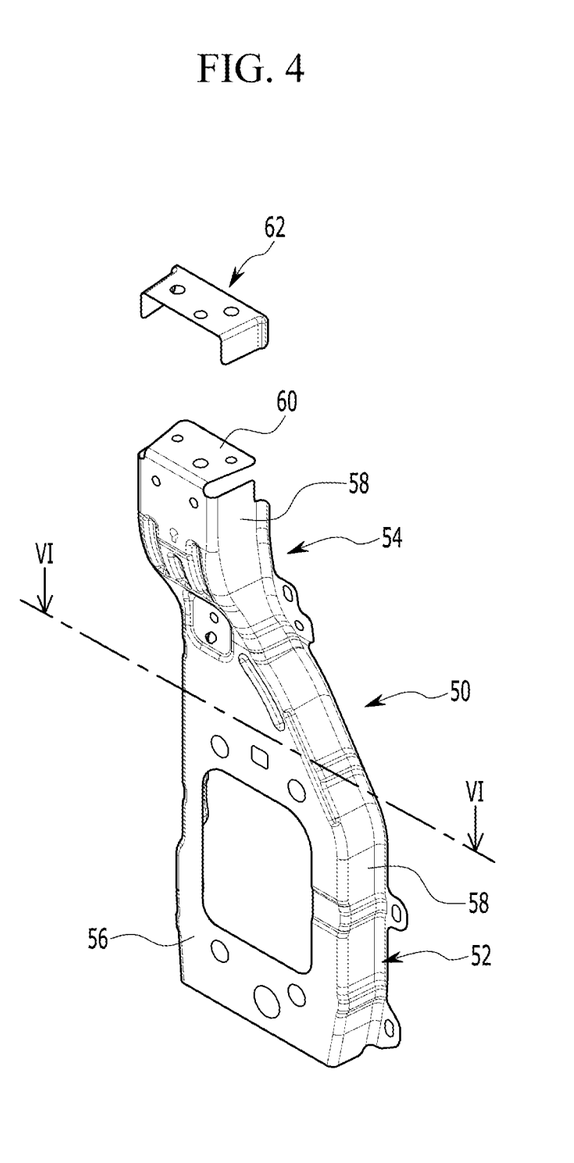
FIG. 4 is an exploded perspective view of a radiator side member that may be applied to a fender apron according to one form of the present disclosure.
Figure 5:
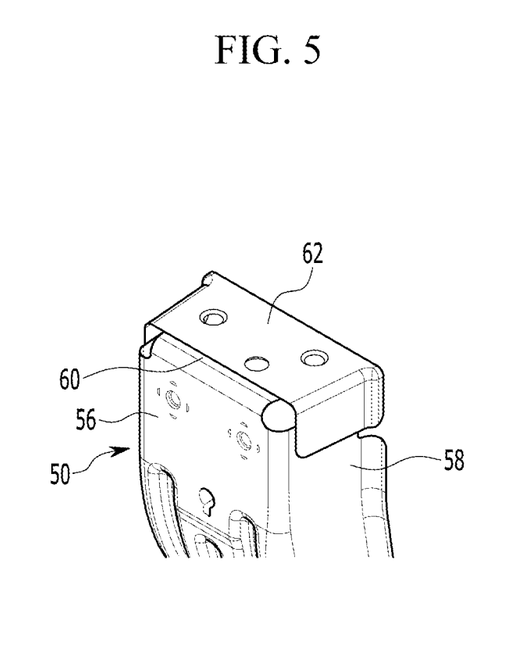
FIG. 5 is a partial perspective view of a radiator side member that may be applied to a fender apron according to one form of the present disclosure.
Figure 6:
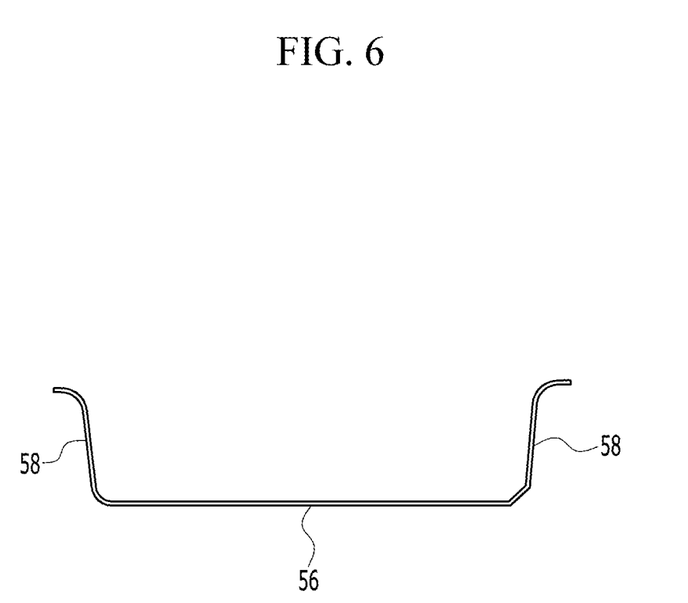
FIG. 6 is a cross-sectional view along the line V-V of FIG. 5.

FIG. 4 is an exploded perspective view of a radiator side member that may be applied to a fender apron according to one form of the present disclosure, FIG. 5 is a partial perspective view of a radiator side member that may be applied to a fender apron according to one form of the present disclosure, and FIG. 6 is a cross-sectional view along the line V-V of FIG. 5.

Referring to FIG. 4 to FIG. 6, the radiator side member 50 may include a lower body 52 coupled with the front member 30, and an upper body 54 coupled with the upper lamp support member 70 and having a narrower width than a width of the lower body 52.

The radiator side member 50 may include a radiator front panel portion 56 disposed in a front direction of the vehicle, and a radiator side panel portion 58 that is bent at the front panel portion 56 to form a side surface. The strength of the radiator side member 50 may be increased by the bending shape of the radiator side member 50.

The radiator side member 50 may further include a radiator upper panel portion 60 that is bent at the front panel portion 56 to form an upper surface. The bent radiator upper panel portion 60 may increase the strength of the radiator side member 50.

The fender apron 20 according to one form of the present disclosure may further include a lamp support bracket 62 formed in a "U" shape to connect the radiator side panel portion 58 and the radiator upper panel portion 60. The strength of the upper part of the radiator side member 50 can be increased by connecting the radiator side panel portion 58 and the radiator upper panel portion 60 using the lamp support bracket 62. Since the lamp support bracket 62 can be combined using bolts or rivets, welding work of the radiator side panel portion 58 and the radiator upper panel portion 60 is unnecessary, thus simplifying the manufacturing process.

Figure 7:
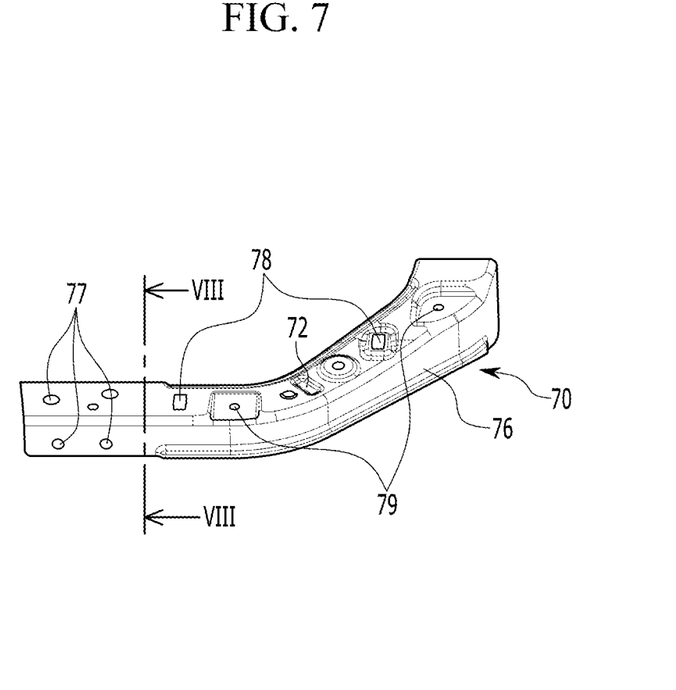
FIG. 7 is a perspective view of an upper lamp support member that may be applied to a fender apron according to one form of the present disclosure.
Figure 8:
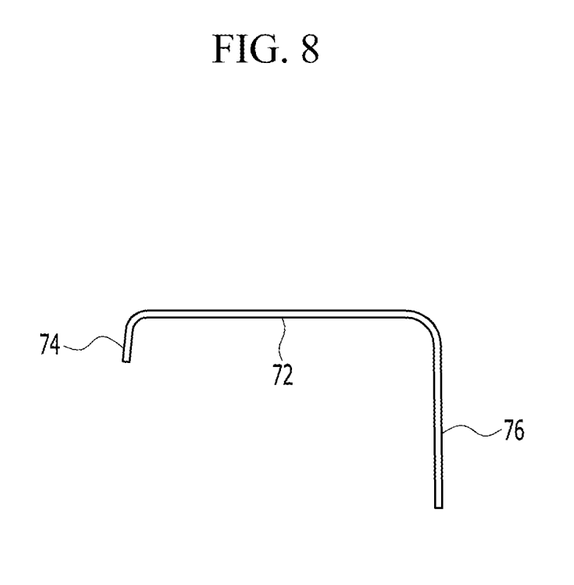
FIG. 8 is a cross-sectional view along the line VIII-VIII of FIG. 7.

FIG. 7 is a perspective view of an upper lamp support member that may be applied to a fender apron according to one form of the present disclosure, and FIG. 8 is a cross-sectional view along the line VIII-VIII of FIG. 7.

Referring to FIG. 3, 7 FIG. 7 and FIG. 8, the upper lamp support member 70 may include a support main body 72 connecting the radiator side member 50 and the upper member 40, a support inner surface 74 bent inside the vehicle width at the support main body 72, and a support outer surface 76 bent out of the width of the vehicle from the support main body 72 and formed longer than the support inner surface 74.

The bent the support inner surface 74 and the support outer surface 76 may increase the strength of the upper lamp support member 70. In addition, the support inner surface 74 is formed shorter than the support outer surface 76, providing an open cross-section for assemble of the upper lamp support member 70.

In the upper lamp support member 70, a support hole 77 for connecting the radiator support upper member 130, a signal lamp hole 78 for mounting the turn signal lamp 120, and a head lamp hole 79 for mounting the head lamp 110 may be formed.

Therefore, according to the fender apron according to one form of the present disclosure, the head lamp 110 and the turn signal lamp 120 may be mounted without a separate bracket.

Figure 9:
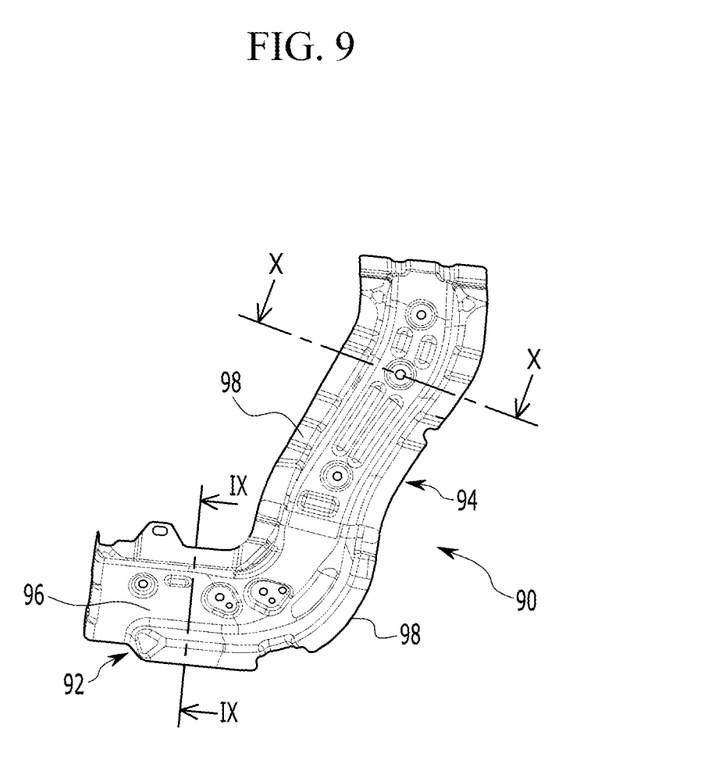
FIG. 9 is a perspective view of a side upper reinforce member that may be applied to a fender apron according to one form of the present disclosure.
Figure 10:
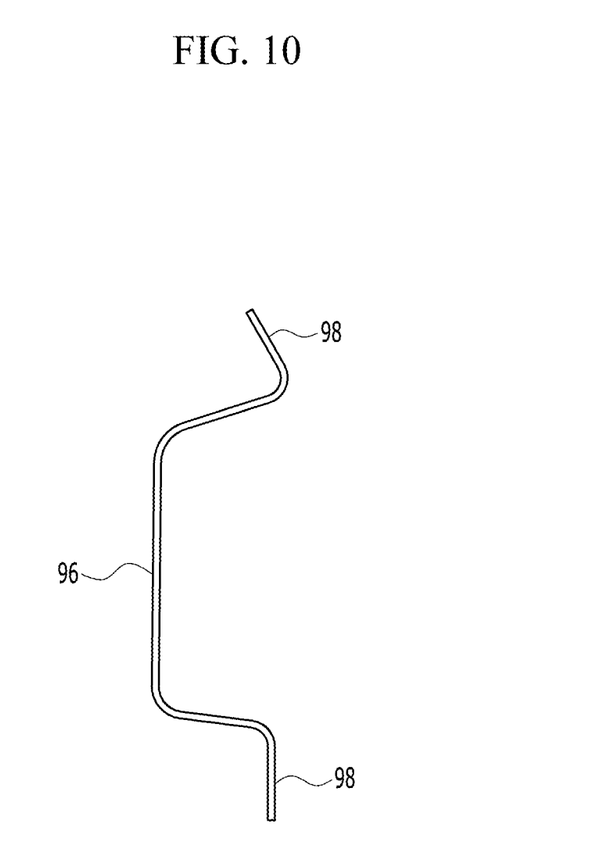
FIG. 10 is a cross-sectional view along the line X-X of FIG. 9.
Figure 11:
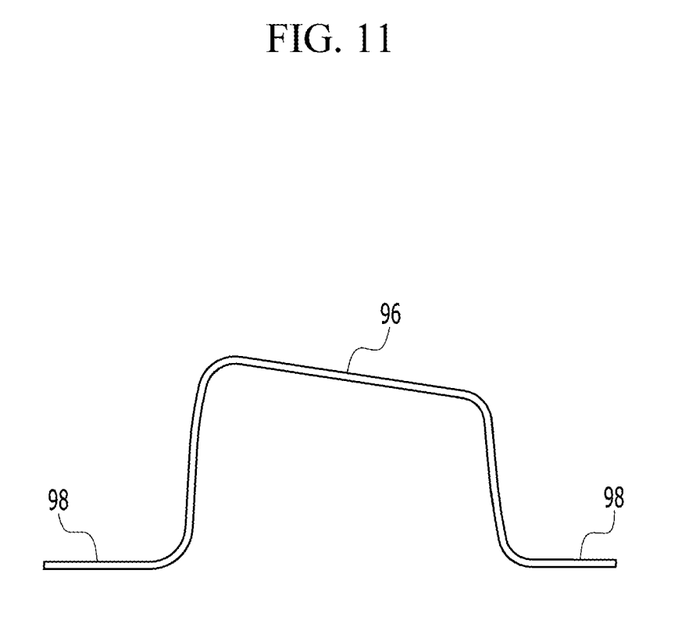
FIG. 11 is a cross-sectional view along the line XI-XI of FIG. 9.

FIG. 9 is a perspective view of a side upper reinforce member that may be applied to a fender apron according to one form of the present disclosure, FIG. 10 is a cross-sectional view along the line X-X of FIG. 9, and FIG. 11 is a cross-sectional view along the line XI-XI of FIG. 9.

Referring to FIG. 3, FIG. 9 to FIG. 11, the side upper reinforce member 90 may include a longitudinal section 92 connected to the radiator side member 50 and an inclined section 94 connected to the upper member 40. The longitudinal section 92 transfers part of the impact load transferred from the radiator side member 50 to the front member 30, and the inclined section 94 transfers part of the impact load transferred from the radiator side member 50 to the upper member 40 in the event of a vehicle collision.

The side upper reinforce member 90 may include a reinforce main portion 96 and a reinforce side portion 98 bent from the reinforce main portion 96. The bent reinforce side portion 98 can increase the strength of the side upper reinforce member 90.

FIG. 12 to FIG. 15 is a drawing showing a method of manufacturing a vehicle body including a fender apron according to one form of the present disclosure.

Hereinafter, referring to FIG. 12 to FIG. 15, a method of manufacturing a vehicle body including a fender apron according to one form of the present disclosure will be described.

Figure 12:
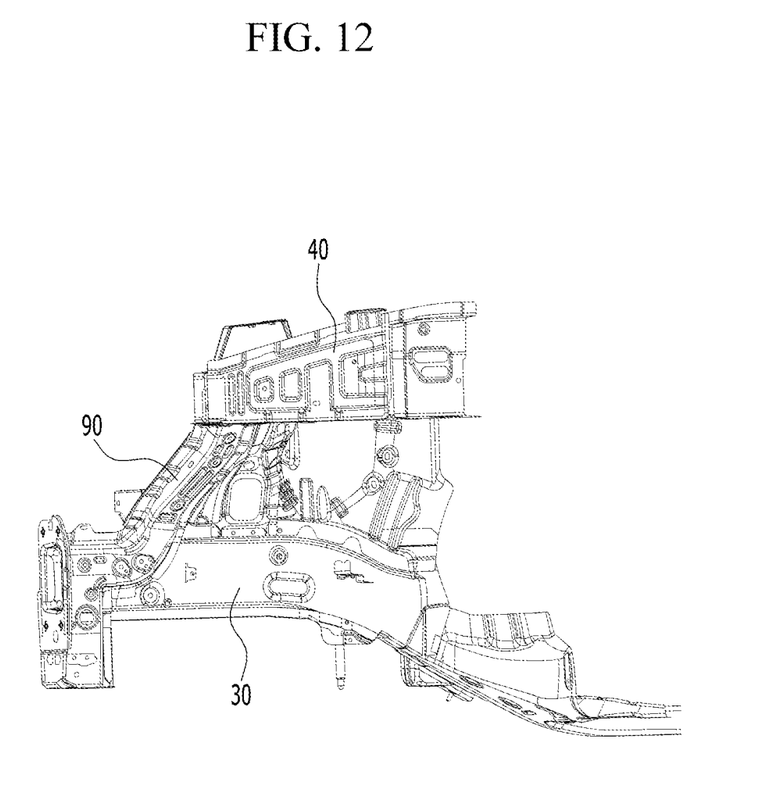
FIG. 12 to FIG. 15 is a drawing showing a method of manufacturing a vehicle body including a fender apron according to one form of the present disclosure.

Referring to FIG. 12, the side upper reinforce member 90 and the upper member 40 is joined to the front member 30 by welding.

Figure 13:
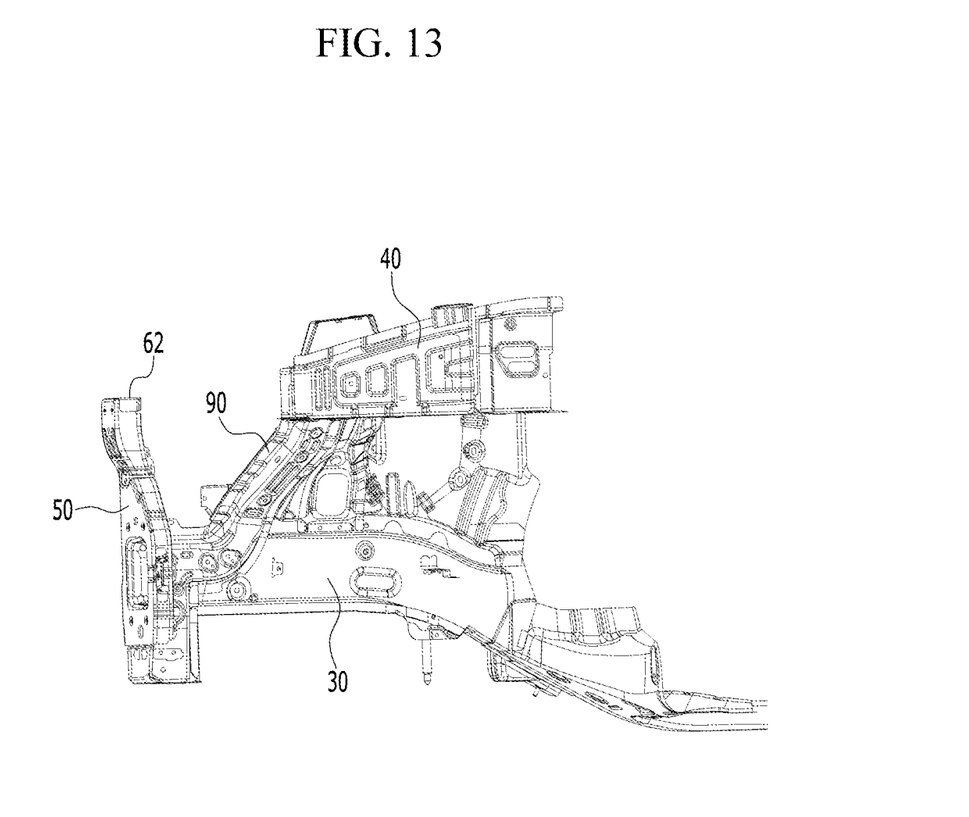

Referring to FIG. 13, the radiator side member 50 is welded to the front member 30 and the side upper reinforce member 90.

Figure 14:
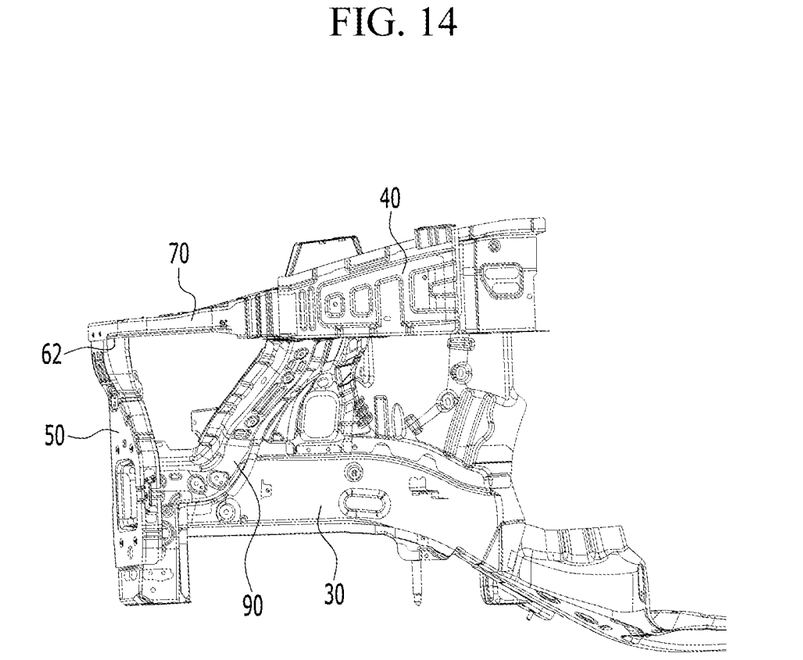

Referring to FIG. 14, the upper part of the radiator side member 50 and the upper member 40 are welded to each other through the upper lamp support member 70 to form an inverted triangle rod path.

Figure 15:
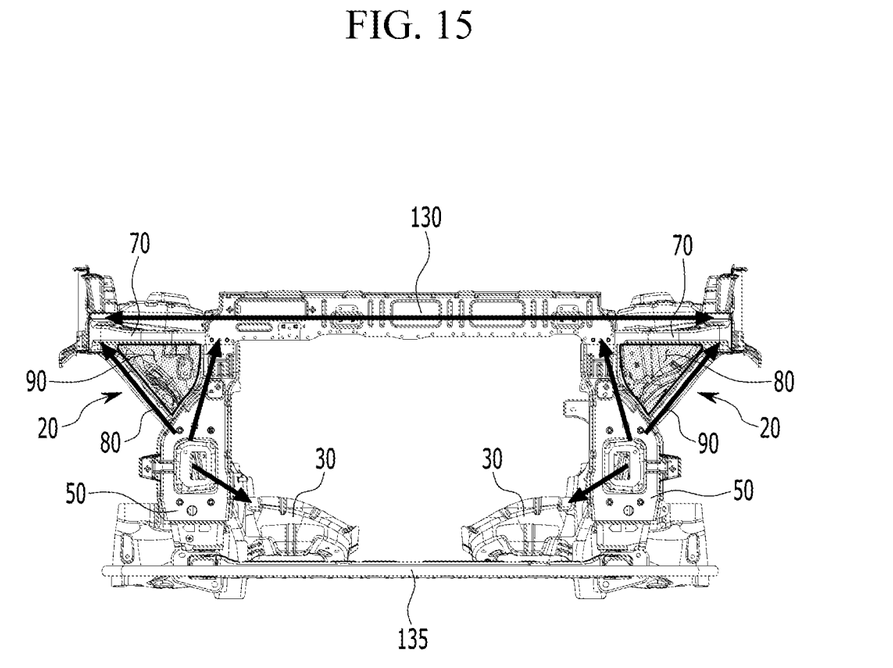

Referring to FIG. 15, the upper part of the fender apron 20 provided on both front sides of the vehicle is connected to the radiator support upper member 40, which may be performed through bolt coupling.

The fender apron according to one form of the present disclosure and the vehicle body including the same may effectively disperse the impact load without an additional crash response structure, and a detachable lamp with separate head lamp and turn signal lamp can be mounted. Therefore, it is possible to reduce manufacturing cost and weight.

That is, as shown in FIG. 15, when a vehicle crashes, the load is properly distributed in the direction of the arrow, so the safety of the occupant may be promoted.

<Description of symbols>

| | |
|---|---|
| 10: vehicle body | 20: fender apron |
| 30: front member | 40: upper member |
| 50: radiator side member | 52: lower body |
| 54: upper body | 56: radiator front panel portion |
| 58: radiator side panel portion | 60: radiator upper panel portion |
| 62: lamp support bracket | 70: upper lamp support member |
| 72: support main body | 74: support inner surface |
| 76: support outer surface | 80: head lamp mounting section |
| 90: side upper reinforce member | 92: longitudinal section |
| 94: inclined section | 96: reinforce main portion |
| 98: reinforce side portion | 110: head lamp |
| 120: turn signal lamp | |
| 130: radiator support upper member | |
| 135: radiator support lower member | |

What is claimed is:

1. A fender apron for a vehicle, the fender apron comprising:
    a front member;
    an upper member provided on the front member;
    a radiator side member connected to the front member;

an upper lamp support member connecting the radiator side member and the upper member; and a side upper reinforce member connecting a first connection portion disposed between the front member and the radiator side member to a second connection portion disposed between the upper member and the upper lamp support member.

2. The fender apron of claim 1, further comprising a head lamp mounting section configured to mount a head lamp, and formed between the radiator side member, the upper lamp support member and the side upper reinforce member.

3. The fender apron of claim 2, further comprising a turn signal lamp mounted on the upper lamp support member.

4. The fender apron of claim 1, wherein the radiator side member comprises:

a lower body coupled to the front member; and an upper body that is connected to the upper lamp support member and has a narrower width than a width of the lower body.

5. The fender apron of claim 4, wherein the radiator side member comprises:

a radiator front panel portion disposed in a front direction of the vehicle; and a radiator side panel portion bent at the radiator front panel portion and forming a side surface.

6. The fender apron of claim 5, wherein the radiator side member further comprises a radiator upper panel portion bent at the radiator front pan& portion and forming an upper surface.

7. The fender apron of claim 6, further comprising a lamp support bracket formed in a "U" shape and configured to connect the radiator side panel portion and the radiator upper panel portion.

8. The fender apron of claim 1, wherein the upper lamp support member comprises:

a support main body connecting the radiator side member and the upper member;

a support inner surface bent inward of a vehicle width at the support main body; and a support outer surface bent outward of the vehicle width from the support main body and formed to be longer than the support inner surface.

9. The fender apron of claim 1, wherein the side upper reinforce member comprises:

a longitudinal section connected to the radiator side member; and an inclined section connected to the upper member.

10. The fender apron of claim 9, wherein the side upper reinforce member comprises:

a reinforce main portion; and a reinforce side portion bent from the reinforce main portion.

11. A vehicle body comprising:

a first and a second fender apron, each comprising:

a front member;

an upper member provided on the front member;

a radiator side member connected to the front member;

an upper lamp support member connecting the radiator side member and the upper member; and a side upper reinforce member connecting a first connection portion disposed between the front member and the radiator side member and a second connection portion disposed between the upper member and the upper lamp support member;

a radiator support upper member connecting upper parts of the first and the second fender aprons; and a radiator support lower member connecting lower parts of the first and the second fender aprons, wherein the first fender apron is provided on a first side of a vehicle front side and the second fender apron is provided on a second side of the vehicle front side.

12. The vehicle body of claim 11, wherein the radiator side member, the upper lamp support member and the side upper reinforce member form an inverted triangle shape.

13. The vehicle body of claim 11, further comprising a head lamp mounting section configured to mount a head lamp, and formed between the radiator side member, the upper lamp support member and the side upper reinforce member.

14. The vehicle body of claim 11 further comprising a turn signal lamp mounted on the upper lamp support member.

15. The vehicle body of claim 11, wherein:

the radiator side member and the front member form a first impact load path;

the radiator side member, the upper lamp support member and the upper member form a second impact load path; and the radiator side member, the side upper reinforce member and the upper member form a third impact load path.

16. The vehicle body of claim 11, further comprising a lamp support bracket formed in a "U" shape, configured to connect a radiator side panel portion and a radiator upper panel portion, and provided between the radiator side member and the upper lamp support member.

17. A method of manufacturing a fender apron, the method comprising:

connecting a side upper reinforce member and an upper member to a front member;

connecting a radiator side member to the front member and the side upper reinforce member; and connecting an upper part of the radiator side member and the upper member through an upper lamp support member.

18. The method of claim 17, further comprising:

connecting an upper part of the fender apron to a radiator support upper member.

* * * * *